(12) United States Patent
Cavazza et al.

(10) Patent No.: US 9,134,988 B2
(45) Date of Patent: Sep. 15, 2015

(54) MANAGING PRE-REQUISITE OF A SOFTWARE PRODUCT VIRTUAL IMAGE

(75) Inventors: Paolo Cavazza, Rome (IT); Giuseppe Ciano, Rome (IT); Antonio Di Cocco, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 13/880,891

(22) PCT Filed: Nov. 3, 2011

(86) PCT No.: PCT/EP2011/069304
§ 371 (c)(1),
(2), (4) Date: Apr. 22, 2013

(87) PCT Pub. No.: WO2012/069296
PCT Pub. Date: May 31, 2012

(65) Prior Publication Data
US 2013/0263113 A1    Oct. 3, 2013

(30) Foreign Application Priority Data
Nov. 23, 2010    (EP) .................................... 10192147

(51) Int. Cl.
*G06F 9/445*    (2006.01)
*G06F 9/46*    (2006.01)
(Continued)

(52) U.S. Cl.
CPC .. *G06F 8/63* (2013.01); *G06F 8/60* (2013.01); *G06F 8/61* (2013.01); *G06F 8/62* (2013.01); *G06F 9/4401* (2013.01); *G06F 9/5077* (2013.01)

(58) Field of Classification Search
CPC ........... G06F 8/60–8/63; G06F 9/4401; G06F 9/5077
See application file for complete search history.

(56) References Cited

U.S. PATENT DOCUMENTS 7,448,034 B2    11/2008  Anderson et al.
8,539,551 B2 *   9/2013  Masuoka et al. .................. 726/3
(Continued)

FOREIGN PATENT DOCUMENTS

EP    1 906 302 A1    4/2008
EP    1 980 942 A1    10/2008
(Continued)

OTHER PUBLICATIONS

PCT International Search Report and Written Opinion, International Application No. PCT/EP2010/067592 dated Apr. 12, 2011, 11 pages.
(Continued)

*Primary Examiner* — Don Wong
*Assistant Examiner* — Mohammad Kabir
(74) *Attorney, Agent, or Firm* — Francis Lammes; Stephen J. Walder, Jr.; Thomas E. Tyson

(57) ABSTRACT

A mechanism is provided for managing pre-requisite software components of a software product distributed on a virtual machine. A list of pre-requisite software components for the software product provided in the software product virtual image distribution package of the software product virtual image is read. A test is performed as to whether each pre-requisite software component in the list of prerequisite software components is not installed in the virtual machine. If the prerequisite software component is not installed, the pre-requisite software component is retrieved. License text of the retrieved pre-requisite software component is read and displayed to a user. Upon approval of the license text by the user, the retrieved pre-requisite software component is installed. The process is repeated until all the pre-requisite software components are installed.

20 Claims, 4 Drawing Sheets

(51) Int. Cl.
*G06F 17/30* (2006.01)
*G06F 9/44* (2006.01)
*G06F 9/50* (2006.01)

(56) References Cited

U.S. PATENT DOCUMENTS

| | | |
|---|---|---|
| 2005/0027831 A1 | 2/2005 | Anderson et al. |
| 2006/0037016 A1* | 2/2006 | Saha et al. .................... 717/178 |
| 2006/0277542 A1* | 12/2006 | Wipfel .......................... 717/174 |
| 2007/0050756 A1 | 3/2007 | Paller |
| 2008/0134176 A1* | 6/2008 | Fitzgerald et al. ................. 718/1 |
| 2008/0163171 A1 | 7/2008 | Chess et al. |
| 2008/0178298 A1* | 7/2008 | Arai et al. ........................ 726/29 |
| 2008/0244600 A1* | 10/2008 | Wong et al. .................... 718/104 |
| 2009/0064135 A1 | 3/2009 | Jimmerson |
| 2009/0210869 A1 | 8/2009 | Gebhart et al. |
| 2009/0265139 A1* | 10/2009 | Klein et al. ................... 702/183 |
| 2009/0300057 A1 | 12/2009 | Friedman |
| 2009/0300076 A1 | 12/2009 | Friedman et al. |
| 2009/0300151 A1 | 12/2009 | Friedman et al. |
| 2009/0300604 A1 | 12/2009 | Barringer |
| 2010/0011353 A1 | 1/2010 | Chalupa et al. |
| 2010/0077165 A1* | 3/2010 | Lu et al. ........................ 711/162 |
| 2010/0198960 A1* | 8/2010 | Kirschnick et al. ........... 709/224 |
| 2011/0004676 A1 | 1/2011 | Kawato |

FOREIGN PATENT DOCUMENTS

| | | |
|---|---|---|
| WO | WO 2009/098909 A1 | 8/2009 |
| WO | WO 2011/069782 A1 | 6/2011 |

OTHER PUBLICATIONS

Ciano, Giuseppe et al., "Automate virtual machine discovery and self-connectivity", XP-002628093, http://public.dhe.ibm.com/software/dw/cloud/library/cl-automatevm-pdf.pdf, retrieved Apr. 22, 2013, 19 pages.

* cited by examiner

MANAGING PRE-REQUISITE OF A SOFTWARE PRODUCT VIRTUAL IMAGE

BACKGROUND

This invention generally relates to installation of a software product distributed as a virtual appliance; more particularly, the invention deals with a method, a computer program and a system for managing pre-requisite software including managing license approval of pre-requisite software that are required when deploying a software product virtual appliance.

Virtual appliances are Virtual Machine images comprising at least one software application and at least one Virtual Machine (VM). A virtual appliance can be directly installed on a Virtual Machine Monitor operating on a physical machine. Virtual appliance is a new way of deploying software applications.

From a software packaging and distribution point of view software developers can create a single platform, reducing the cost and complexity of software development and management. Virtual appliances are provided to the user or customer as files, via either electronic downloads or physical distribution. By distributing virtual appliances, the software application manufacturers deliver a turnkey software service to the end user.

It is noted that the new virtual appliances are more complex. Whereas current virtual appliances contain a single VM only, for modern enterprise applications model service oriented architectures (SOA) with multiple tiers, each tier contains one or more machines. A single VM model is thus not sufficient to distribute a multi-tier service and so virtual appliance will be composed of more VMs. For example, a typical web application may consist of three tiers: a web tier that implements the presentation logic, an application server tier that implements the business logic and a back-end database tier. A straightforward implementation would divide this into 3 virtual machines, one for each tier. In this way, the application can scale from the fraction of a single physical host to 3 physical hosts.

One problem with complex virtual appliance installation comes from the fact that the software product vendor may provide a virtual appliance in which the image of the product to be installed in a virtual environment requires additional pre-requisite software. Precisely these 'pre-requisite software' comprise one software program or a package which may group software programs and data. These pre-requisite software/packages are not provided with the product itself but the customer has to download and install them (accepting also the related license terms and conditions) before installing the product using the traditional installation approach.

On the other hand, if the vendor decides to provide the virtual appliance in which the product is already installed along with the additional required pre-requisite packages/software this can lead to a non-compliance scenario with the corresponding prerequisite packages/software licenses when the customer will deploy the image in his virtual environment.

The US patent application US20090300604, discloses a method for software dependency resolution during a Virtual Machine installation by enabling a user to select the software contained in the origin repositories in relation to a virtual appliance and for displaying a set of licensing conflicts that might occur during the installation of the corresponding packages. The typical scenario is that a Virtual Machine is instantiated, and, depending on the "SW to be installed", the proper install-time "SW dependencies" are installed as well. This is quite a general process regardless of the virtualization context.

SUMMARY

In one illustrative embodiment, a method, in a data processing system, is provided for installing pre-requisite software of a software product on a virtual machine instantiated by mounting the at least one virtual disk from a software product virtual image distribution package. In the illustrative embodiment, the method comprises automatic execution at boot time of: reading a list of pre-requisite components software for the software product provided in the software product virtual image distribution package of the software product virtual image; testing if each pre-requisite software component in the list of prerequisite software components is not installed in the virtual machine and, if the prerequisite software component is not installed, retrieving the pre-requisite software component after reading a pre-requisite software component location in a repository provided in the software product virtual image distribution package of the software product virtual image; reading license text of the retrieved pre-requisite software component and displaying the license text to a user; upon approval of the license text by the user, installing the retrieved pre-requisite software component; and repeating the three preceding steps until all the pre-requisite software components are installed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

DETAILED DESCRIPTION

Figure 1:
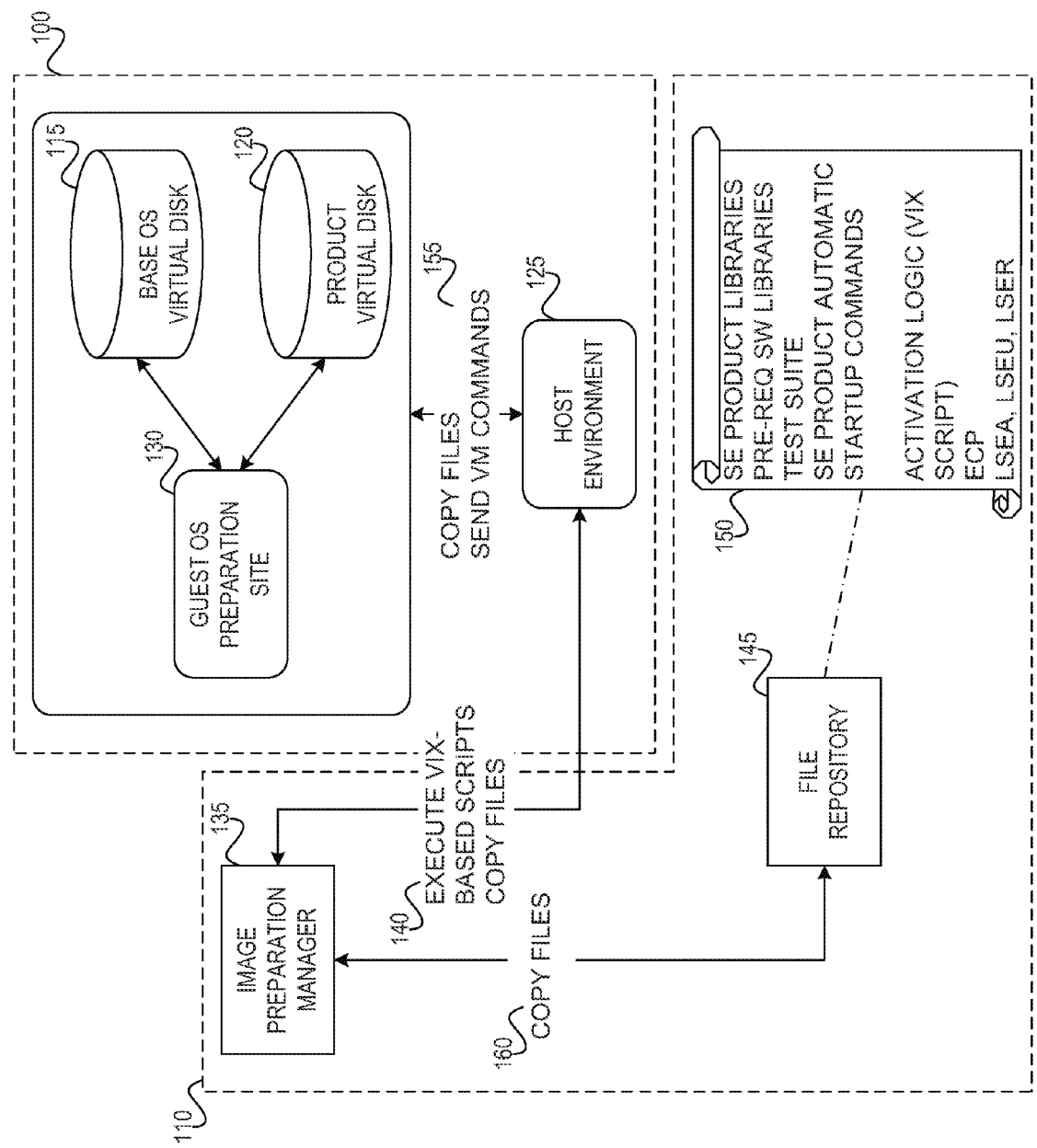
FIG. 1 illustrates the system environment to set up a preparation site in which is created a virtual appliance according to the preferred embodiment of the invention.

FIG. 1 illustrates the system environment to set up a preparation site in which is created a virtual appliance according to the preferred embodiment of the invention. To create the image of the virtual appliance for a software product, the software vendor may have a virtual management server (110) to manage virtual machine environment and a preparation site server (100) on which virtual machines can be installed. For instance, the Host Environment (125) which is a virtual machine monitor, can be a VMware (VMware is a trademark of VMware Inc.) virtual machine monitor to manage virtual machines (VMs), the Guest OS (130), with its virtual disks (115, 120).

A file repository (145) is used by the Image preparation manager (135) to store all the files (150) necessary to build the virtual appliance for the software product.

The virtual management server (110) communicates with the virtual machine monitor using its API which is for instance VIX for the VMware virtual machine monitor. The API is used for instance for copying (140, 155, 160) files from the file repository (145) to the Guest OS Preparation site (130). The API commands can be either used interactively or through scripts which are submitted to perform the same operations automatically.

Figure 2:
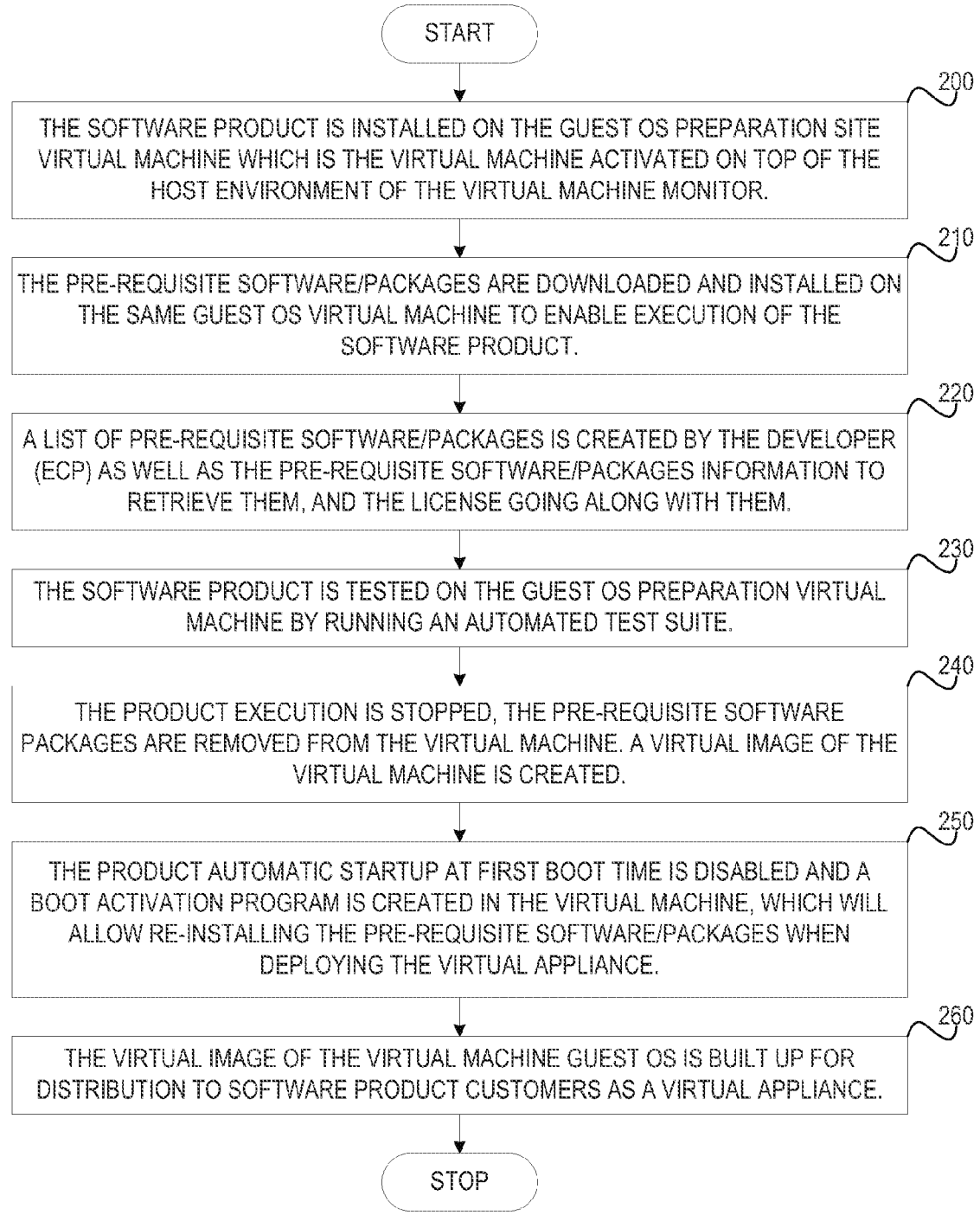
FIG. 2 is the flowchart of the method to prepare the image of the virtual appliance to distribute a software product.

FIG. 2 is the flowchart of the method to prepare the image of the virtual appliance to distribute a software product. This image preparation can be performed in an automatic way by the use of scripts implementing API commands for communication with the virtual machine monitor.

The first step (200) consists in installing the software product to be distributed as a virtual appliance, on the preparation site. The software product is installed on the Guest OS Preparation site virtual machine which is the virtual machine activated on top of the Host Environment of the virtual machine monitor.

The pre-requisite software/packages are downloaded and installed (210) on the same Guest OS virtual machine to enable execution of the software product. These pre-requisite software/packages may be open source packages to be downloaded from Internet for instance. They can be .rpm files, for instance, modifying the AIX (AIX is a trademark of IBM Corporation) or Linux (Linux is a trademark of Linus Torvals in the US and other countries) standard operating system services.

A list of pre-requisite software/packages, so called the External Component Prerequisite (ECP), is created by the developer; the ECP list contains the list of the pre-requisite software/packages necessary to be installed for execution of the software product. This list is used during the installation of the software product at the customer site. The additional information also created by the developer and used during for the installation of the software product at the customer site are the pre-requisite software/packages information to retrieve them (the URL address where to download it from for instance), a repository referencing all the software in the virtual image and optionally the license text of the pre-existing software/packages (220) that the customer must accept before the installation.

The software product is tested (230) on the Guest OS preparation virtual machine. This test can be running an automated test suite.

Assuming the test suite is performed without any error, the product execution is then stopped (240).

The pre-requisite software/package artifacts listed in the ECP List are removed (250) from the virtual machine. A virtual image is created from the Guest OS preparation site virtual machine (it may comprise one or more virtual disks one for the operating system one for the program product for instance); the virtual image does not contain any pre-requisite software.

Usually, the activation of a software program is started automatically at boot time when the virtual machine is instantiated from the virtual appliance. In order to prevent the customer to automatically start execution of the software product, the product automatic startup at first boot time (usually in the OS virtual disk) is disabled. Instead, a specific Activation Program (described below) is created and added in the virtual image. The Activation Program will be started at when the user will deploy the virtual appliance (250) for installing the pre-existing software/packages before activation of the program product itself.

Figure 4:
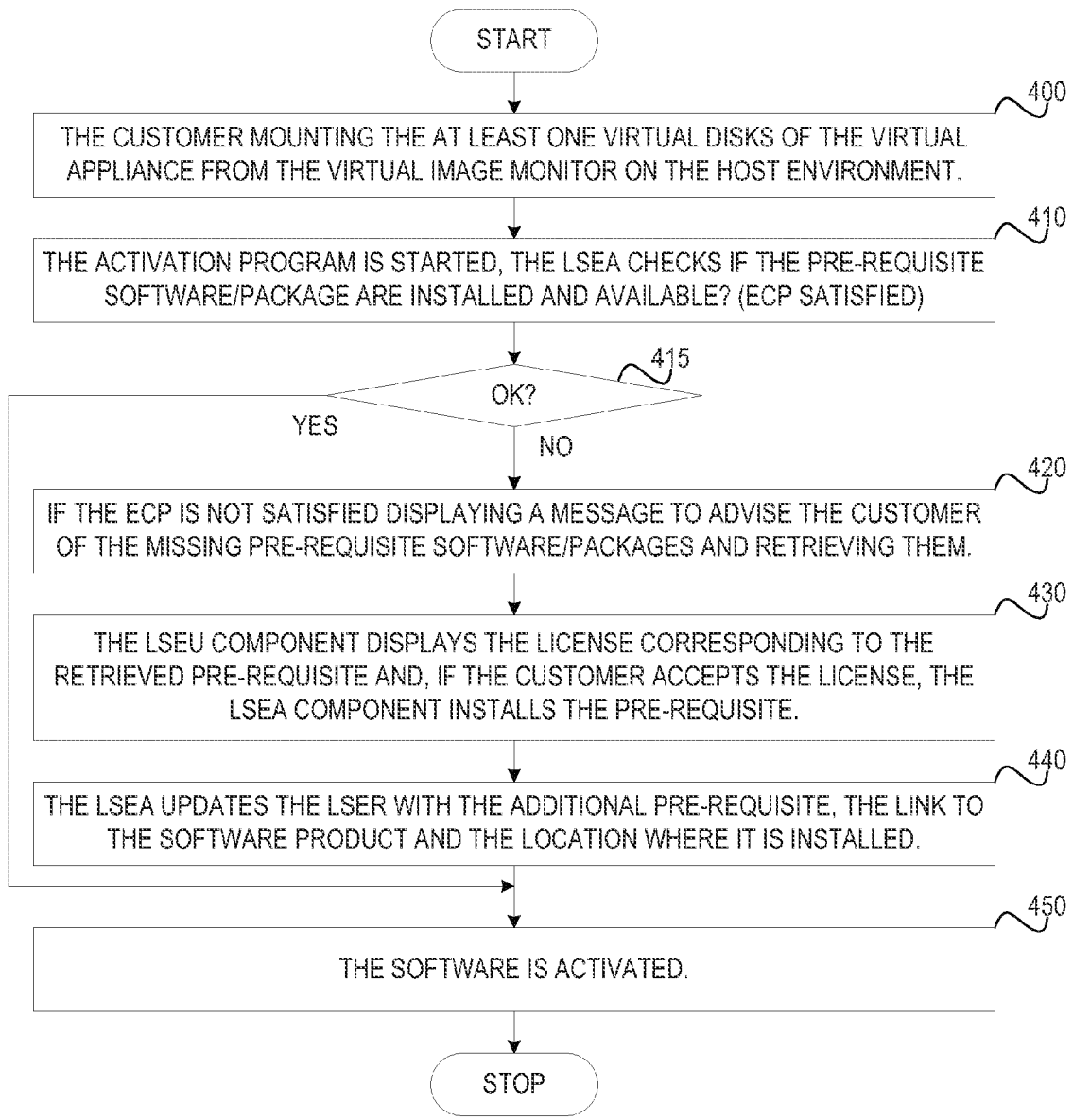
FIG. 4 is the flowchart of the method, according to the preferred embodiment of the invention, for deploying the virtual appliance of the software product in the customer virtual environment.

The activation program will be better described in relation with description of FIG. 4 describing the steps of the method for deploying the virtual appliance in a customer virtual environment.

In step 260 the virtual appliance package is built for distribution to the customers. The developer includes in the virtual appliance distribution package additional Information necessary for installation such as:

- a repository describing what is installed on the virtual system: during the activation phase at the customer site, the repository is read when retrieving the pre-requisite software/packages. As the pre-requisite software/packages have been removed from the virtual machine by the developer, when creating the virtual appliance, there is no software product pre-requisite software/packages referenced in this repository. During the activation phase, the Activation Program uses this repository to check if the pre-requisite software/packages mandatory for the software product are installed, as described later on in the document (410) in reference to the description of FIG. 4. If the repository is an OS repository such as the Windows (Windows is a trademark of Microsoft Corporation) OS registry or the Linux RPM, it is included in the virtual disk—the ECP (list of the pre-requisite software/packages for one given product)
- the location where the pre-requisite software/packages can be retrieved; the location may be for instance a URL address where to download the software/package.
- optionally, the list of license texts of the product pre-requisite software/packages, if these texts have been collected during the creation of the virtual disks; in the preferred embodiment the license texts will be retrieved on the fly during the installation of the pre-requisite software/packages by the Activation Program.
- security features for secured access by the user to the virtual appliance information.

This additional information necessary for the activation phase can be either included in the virtual disk or provided separately in the virtual appliance distribution package. The ECP which cannot be changed is included in the virtual image. The other additional information such as the location of the pre-requisite software/packages are preferably not included in the virtual disk as they can be modified by the user during the activation phase: for instance the user can change the location in case the pre-requisite software/packages can be retrieved in the user installation from one other location. For instance, the user may replace a URL address entered by the developer at creation of the virtual image by a repository file in case all the pre-requisite software/package can be found from this repository on the customer site.

User interfaces can be used by the developer to fill the ECP and other information concerning the pre-requisite software/packages as mentioned above.

Any format applying to virtual appliance package preparation can be used. The Open Visualization Format (OVF) specification is a standard being developed within the Distributed Management Task Force (DMTF) association may be used. The OVF distribution package comprises an OVF descriptor XML file (also called the OVF envelope) which may include the additional information necessary for installation (ECP, license information etc. . . . ); it also comprises the OVF manifest and certification file used for security when accessing the OVF package and the virtual disk images.

Figure 3:
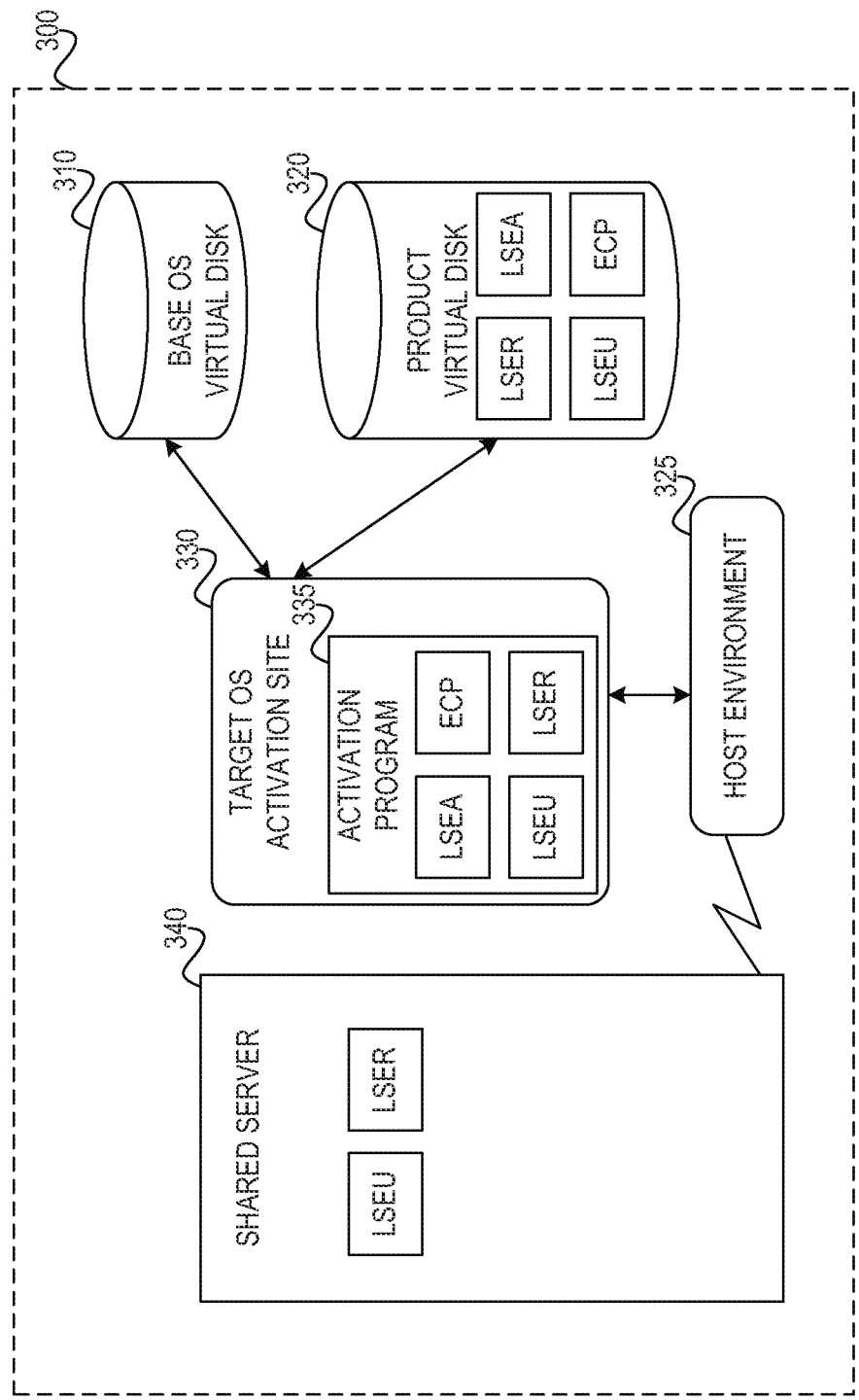
FIG. 3 illustrates the system environment for deploying the virtual appliance of the software product in the customer virtual environment.

FIG. 3 illustrates the system environment for deploying the virtual appliance of the software product in the customer virtual environment.

The customer system environment (300) for installing and activating the software application may comprise a server on which a virtual machine monitor such as a VMware virtual machine monitor, the Host Environment (325) manages virtual machines. The virtual appliance which has been prepared according to the method described in FIG. 2 consists, for instance, in two virtual disks one with the OS image (310) and one with the program product data (320).

The steps to usually start a virtual machine comprise first instantiating the virtual machine by loading the virtual disks and then activating the virtual machine which is done automatically by the boot strap located usually on the Operating System virtual disk. To deploy a virtual appliance containing a software product, the customer first instantiates the virtual machine by mounting the virtual disks of the virtual appliance. The customer deploying the virtual appliance which has been created according to the steps described in FIG. 2 instantiates the virtual machine and instead having a boot program automatically activating the software program, the Activation Program is started.

The Activation Program which is loaded (335) comprises the Licensing Software entities Activator (LSEA), the Licensing Software Entities Registry (LSER) and the Licensing Software Entities User Interface (LSEU). The LSEA component is the main component allowing a compliant installation and activation of pre-requisite software/packages: it checks at activation phase if the pre-requisite software/packages are already installed, and allows installation only if the license is accepted by the user. The LSER component is a registry containing the list of pre-requisite software/packages which have been retrieved before or which are installed during the activation phase their link with the software product and the address were the pre-requisite software can be retrieved. Each time a new pre-requisite software/package is installed, it is registered in the LSER. The LSER contains references to pre-requisite software/packages installed during the activation phase of a software product installation. A LSER contains software/packages installed before the activation phase if it the LSER is shared by more than one system (physical or virtual machine) because a same software/package can be a pre-requisite software/package for more than one software product and which may have been already retrieved for these other software products. The LSEU user interfaces is able to retrieve and display to the user, at any time during the activation phase, the license text of the pre-requisite software/packages for the product to be installed. The Activation program also uses the ECP and additional information provided in the virtual appliance distribution package such as the location where to download the pre-requisite software/packages, which are useful for installation. All these components and information will be more described in relation with their use in the Activation program at deployment of the virtual appliance in the description of FIG. 4.

During the activation phase of the virtual appliance deployment, the Activation Program is loaded (335) and executed in the VM (330). As stated before, the ECP and LSEA components are related to the installation and activation of a specific software product but, the LSEU and LSER which are available from the distributed virtual image may be optionally used not from the virtual disk (320, 335), but from one remote server (340) accessed by the virtual machine through the Virtual Machine Monitor of the Host environment (325). The user may thus optionally use a server (340) (on a virtual or physical machine) which is shared by many systems at the customer site for installation/activation of software products; this server may have installable pre-requisite software/packages available because they are pre-requisite software/packages for more than one software product. In this case the LSER and LSEU components are used by more than one system (physical or virtual machines) on which a software program is installed and activated.

The customer uses the virtual machine monitor API from the Host Environment (either as on line commands or through scripts) to start the virtual machine and interface it to modify files etc. . . .

FIG. 4 is the flowchart of the method, according to the preferred embodiment of the invention, for deploying the virtual appliance of the software product in the customer virtual environment as described in FIG. 3. It is assumed that the virtual appliance has been created according to the steps in the flowchart of FIG. 2. The flowchart of FIG. 4 describes the steps of execution of the Activation Program (410, 450) distributed with the virtual appliance.

The user first mounts (400) the virtual disks of the virtual appliance, for instance, one virtual disk for the OS and one virtual disk for the software product. The customer deploying the virtual appliance wants to starts a new virtual machine as a Target OS on top of the virtual machine monitor forming the Host Environment and to start execution of the software product in this virtual machine. Once the virtual disks are mounted, the virtual machine is instantiated and the boot program starts execution from a virtual disk, usually from the OS virtual disk. With the Activation Program created during the image preparation by the software product vendor and started at boot time, the execution of the software product itself is not immediately started because the pre-requisite software/packages were removed from the VM image. Instead, the LSEA main component of the Activation Program checks (410) if all the pre-requisite software/packages are installed and available in the image already instantiated by virtual disk mounting. To perform this checking the LSEA looks at the ECP provided in the virtual appliance package which contains the list of all the necessary pre-requisite software/packages attached to the product to be activated and first check if they are not already installed by the customer. This is done by reading the repository referencing all the installed software which has been distributed as additional information in the virtual appliance and which could be either an OS repository or an independent file. It is noted that a necessary pre-requisite software/package may have been already installed by the user for one other product installation and the corresponding repository may have been already updated by this installation. If all the pre-requisite software/packages are installed and activated, (answer yes to test 415), the product is directly activated (go to step 450).

If the External Component Prerequisite list is not satisfied (answer no to 415) the customer installing the virtual machine is advised, preferably by a message displayed at the console of the Host Environment, that a pre-requisite software/package is missing. Then, the pre-requisite software/packages of the ECP have to be retrieved (420). Three cases are encountered by the Activation program to retrieve a pre-requisite software/package:

the Activation Program retrieves the address read in the LSER where to find the pre-requisite software/package which is already installed in the user environment.

the Activation program, by reading the additional information provided with the virtual appliance package (for instance the OVF) checks where the pre-requisite software/package can be retrieved from, by retrieving for instance the URL where the pre-requisite software/package can be downloaded.

retrieving is skipped by the Activation program and will be performed later on by the VM user. This is the case, for example, if the virtual machine is deployed in an isolated environment and it is not possible to retrieve packages in any case, or the virtual machine monitor used to activate the virtual image does not allow to attach any additional repository to the image. In this case, The Activation Program is ended without performing the software product activation (STOP). When this option is chosen, the user will have to retrieve the pre-requisite software/package himself and to install it manually.

The LSEU reads the license (430) from the retrieved pre-requisite software/package artifacts, displays it to the user and asks the user if he accepts the license. If the user does not accept the license the Activation program is ended without performing the software product activation (STOP). The user will have to solve his problem with the license before accepting a future installation.

If the user accepts the license, the LSEA component installs the pre-requisite software/package (430). The LSEA then, updates the LSER (440) with the installed pre-requisite software/package location and the relationship with the other pre-requisite software/packages and the software product relationship. If this step is not performed the activation program is ended (STOP).

Once all the pre-requisite software/package are installed, the last step is for activating the software product (450). Activation of the program product may require a step of configuration, if it is necessary, and a step of stalling execution of the program which is already available from the virtual disks in the virtual machine.

It is noted that for displaying the license texts for approval by the user installing the virtual image, the LSEU component may read the license texts from a license file already provided by the developer creating the virtual image or the LSEU may extract the license text on the fly during the activation phase from the location where the pre-requisite software/package is stored.

Consequently, during the virtual machine activation phase, the pre-requisite software/package which where removed from the virtual image by the developer are re-installed automatically but in a compliant way.

All the steps of image creation and software product installation can be done automatically using scripts based on the API of the virtual machine monitor.

The invention claimed is:

1. A method for installing pre-requisite software components of a software product on a virtual machine instantiated by mounting at least one virtual disk from a software product virtual image distribution package, the method comprising automatic execution at boot time of:

reading a list of pre-requisite software components for the software product provided in the software product virtual image distribution package of the software product virtual image;

testing whether each pre-requisite software component in the list of prerequisite software components is installed in the virtual machine and, responsive to the prerequisite software component not being installed, retrieving the pre-requisite software component after reading a location of the pre-requisite software component in a repository provided in the software product virtual image distribution package of the software product virtual image;

responsive to the pre-requisite software component being retrieved from the location of the pre-requisite software component identified in the repository provided in the software product virtual image distribution package of the software product virtual image, reading license text of the retrieved pre-requisite software component and displaying the license text to a user;

upon approval of the license text by the user, installing the retrieved pre-requisite software component; and repeating the preceding steps, other than the reading of the list of pre-requisite software components, until all the pre-requisite software components are installed.

2. The method of claim 1, further comprising:

responsive to the pre-requisite software component being installed in the virtual machine, skipping the following retrieving, reading, displaying and installing steps for this pre-requisite software component.

3. The method of claim 1, further comprising:

responsive to the pre-requisite software component is not indicated as already installed in the virtual machine, testing whether the pre-requisite software component has already retrieved by reading a location where the pre-requisite software component was retrieved in a list of all already retrieved prerequisite software components, wherein the list of all already retrieved pre-requisite software components being updated with newly retrieved pre-requisite software component after each step of installing the retrieved pre-requisite software component.

4. The method of claim 1, wherein the steps of reading the license text and displaying the license text comprise an initial step of communicating with a remote server to request the reading and the displaying steps to be performed by the remote server.

5. The method of claim 1, wherein the step of reading the license text of the retrieved pre-requisite software component comprises an initial step of extracting the license text from the retrieved pre-requisite software component.

6. The method of claim 1, wherein the step of reading the license text of the retrieved pre-requisite software comprises reading the license text from a license file provided in the software product virtual image distribution package of the software product virtual image.

7. The method of claim 1, further comprising the preceding steps of:

installing the software product and pre-requisite software components for the software product on a developer virtual machine;

testing the software product in the developer virtual machine;

removing all the pre-requisite software components for the software product from the developer virtual machine;

creating at least one virtual disk of the developer virtual machine;

creating a boot program to be activated when the at least one virtual disk is mounted;

creating a list of the pre-requisite software components for the software product;

creating a repository comprising the location where the pre-requisite software components are to be retrieved;

creating the software product virtual image distribution package including the at least one virtual disk, the list of the pre-requisite software components for the software product, and the repository comprising the location where the pre-requisite software components are to be retrieved.

8. The method of claim 7, further comprising:

creating a license file containing license texts of the pre-requisite software components for the software product, and adding the license file to the software product virtual image distribution package.

9. The method of claim 1, wherein, responsive to the pre-requisite software component not being installed and the pre-requisite software component not being retrievable from the location of the pre-requisite software component identified in the repository provided in the software product virtual image distribution package of the software product virtual image, indicating that a manual installation of the pre-requisite software component is required and stopping the process of installing the pre-requisite software components of a software product.

10. The method of claim 1, wherein the pre-requisite software component retrieving step further comprises reading an Internet address of the location of the pre-requisite software component in the repository provided in the software product virtual image distribution package, and the retrieved pre-requisite software component installing step comprises downloading the pre-requisite software component from the Internet address.

11. A system for installing pre-requisite software components of a software product on a virtual machine instantiated by mounting at least one virtual disk from a software product virtual image distribution package comprising:

a processor; and a memory coupled to the processor, wherein the memory comprises instructions which, when executed by the processor, cause the processor to:

read a list of pre-requisite software components for the software product provided in the software product virtual image distribution package of the software product virtual image;

test whether each pre-requisite software component in the list of prerequisite software components is installed in the virtual machine and, responsive to the prerequisite software component not being installed, retrieve the pre-requisite software component after reading a location of the pre-requisite software component in a repository provided in the software product virtual image distribution package of the software product virtual image;

responsive to the pre-requisite software component being retrieved from the location of the pre-requisite software component identified in the repository provided in the software product virtual image distribution package of the software product virtual image, read license text of the retrieved pre-requisite software component and display the license text to a user;

upon approval of the license text by the user, install the retrieved pre-requisite software component; and repeat the preceding steps, other than the reading of the list of pre-requisite software components, until all the pre-requisite software components are installed.

12. The system of claim 11, wherein the instruction further cause the processor to:

responsive to the pre-requisite software component not being indicated as already installed in the virtual machine, test whether the pre-requisite software component has been already retrieved by reading a location where the pre-requisite software component was retrieved in a list of all already retrieved pre-requisite software components, wherein the list of all already retrieved pre-requisite software components being updated with newly retrieved pre-requisite software component after each step of installing the retrieved pre-requisite software component.

13. The system of claim 11, wherein the instructions to read the license text of the retrieved pre-requisite software component further cause the processor to initially extract the license text from the retrieved pre-requisite software component.

14. The system of claim 11, wherein the instructions to read the license text of the retrieved pre-requisite software further cause the processor to read the license text from a license file provided in the software product virtual image distribution package of the software product virtual image.

15. The system of claim 11, wherein the instructions to retrieve pre-requisite software component further cause the processor to read an Internet address of the location of the pre-requisite software component in the repository provided in the software product virtual image distribution package, and the instructions to install the retrieved pre-requisite software component further causes the processor to download the pre-requisite software component from the Internet address.

16. A computer program product comprising a non-transitory computer readable storage medium having a computer readable program stored therein for installing pre-requisite software components of a software product on a virtual machine instantiated by mounting at least one virtual disk from a software product virtual image distribution package, when executed on a computer, causes the computer to:

read a list of pre-requisite software components for the software product provided in the software product virtual image distribution package of the software product virtual image;

test whether each pre-requisite software component in the list of prerequisite software components is installed in the virtual machine and, responsive to the prerequisite software component not being installed, retrieve the pre-requisite software component after reading a location of the pre-requisite software component in a repository provided in the software product virtual image distribution package of the software product virtual image;

responsive to the pre-requisite software component being retrieved from the location of the pre-requisite software component identified in the repository provided in the software product virtual image distribution package of the software product virtual image, read license text of the retrieved pre-requisite software component and display the license text to a user;

upon approval of the license text by the user, install the retrieved pre-requisite software component; and repeat the preceding steps, other than the reading of the list of pre-requisite software components, until all the pre-requisite software components are installed.

17. The computer program product of claim 16, wherein the computer readable program further cause the computer to:

responsive to the pre-requisite software component not being indicated as already installed in the virtual machine, test whether the pre-requisite software component has been already retrieved by reading a location where the pre-requisite software component was retrieved in a list of all already retrieved pre-requisite software components, wherein the list of all already retrieved pre-requisite software components being updated with newly retrieved pre-requisite software component after each step of installing the retrieved pre-requisite software component.

18. The computer program product of claim 16, wherein the computer readable program to read the license text of the retrieved pre-requisite software component further causes the computer to initially extract the license text from the retrieved pre-requisite software component.

19. The computer program product of claim 16, wherein the computer readable program to read the license text of the retrieved pre-requisite software further causes the computer to read the license text from a license file provided in the software product virtual image distribution package of the software product virtual image.

20. The computer program product of claim 16, wherein the computer readable program to retrieve pre-requisite software component further causes the computer to read an Internet address of the location of the prerequisite software component in the repository provided in the software product virtual image distribution package, and the computer readable program to install the retrieved pre-requisite software component further causes the computer to download the pre-requisite software component from the Internet address.

\* \* \* \* \*